United States Patent
Hähn et al.

[11] Patent Number: 5,814,209
[45] Date of Patent: Sep. 29, 1998

[54] METHOD FOR ECOLOGICAL UTILIZATION OF ACID EFFLUENTS OF FULLER'S EARTH

[75] Inventors: Reinhard Hähn; Klaus Schurz, both of Munich; Hans Buckl, Freising; Wolfgang Eisenschmid, Au Hallertau, all of Germany

[73] Assignee: Sud-Chemie AG, Germany

[21] Appl. No.: 333,222

[22] Filed: Oct. 2, 1994

Related U.S. Application Data

[63] Continuation of PCT/EP94/00593 Mar. 1, 1994.

[30] Foreign Application Priority Data

Mar. 3, 1993 [DE] Germany ............ 43 06 663.1

[51] Int. Cl.$^6$ .................................. C10G 25/06
[52] U.S. Cl. ................ 208/299; 502/243; 502/406; 502/407; 502/408; 502/411; 502/412; 423/332; 423/333; 210/687; 252/194; 252/179; 252/175; 208/251 R
[58] Field of Search ............. 502/243, 406, 502/407, 408, 411, 412; 423/332, 333; 210/687; 252/194, 179, 175; 208/299, 251 R

[56] References Cited

U.S. PATENT DOCUMENTS

| | | | |
|---|---|---|---|
| 3,755,183 | 8/1973 | Fahn et al. | 252/194 |
| 3,837,872 | 9/1974 | Conner | 106/74 |
| 4,661,612 | 4/1987 | George et al. | 556/450 |
| 4,664,839 | 5/1987 | Rieck et al. | 252/175 |
| 4,812,436 | 3/1989 | Stall et al. | 502/411 |
| 4,820,439 | 4/1989 | Rieck et al. | 252/135 |
| 5,079,208 | 1/1992 | Lammers et al. | 502/238 |
| 5,130,028 | 7/1992 | Cody et al. | 210/691 |

FOREIGN PATENT DOCUMENTS

| | | |
|---|---|---|
| 15152 | 9/1980 | European Pat. Off. |
| 92108 | 10/1983 | European Pat. Off. |
| 164514 | 12/1985 | European Pat. Off. |
| 2036819 | 7/1970 | Germany . |
| 2339934 | 3/1974 | Germany . |
| 2100627 | 7/1974 | Germany . |
| 2028817 | 12/1975 | Germany . |
| 2028322 | 4/1977 | Germany . |
| 49-004349 | 1/1974 | Japan . |
| 52-047592 | 4/1977 | Japan . |
| 55-149673 | 11/1980 | Japan . |
| 56-130225 | 10/1981 | Japan . |

*Primary Examiner*—Glenn Caldarola
*Assistant Examiner*—Nadine Preisch
*Attorney, Agent, or Firm*—Scott R. Cox

[57] ABSTRACT

Disclosed is a process for the ecological usage of acid effluents. Also disclosed is a sorption agent which is characterized in that an acid effluent, created from the production of fullers earth which contains as main ingredients $Fe^{2+/3+}$-, $Al^{3+}$-, $Ca^{2+}$- and $Mg^{2+}$ cations and inorganic anions, is reacted with an alkali silicate. The resultant precipitate is separated in an aqueous phase and, when necessary, purified and dried. The sorption agent can be used for the bleaching of oils or for the removal of soaps, phospholipids and heavy metals from oils, specifically edible oils.

20 Claims, No Drawings

METHOD FOR ECOLOGICAL UTILIZATION OF ACID EFFLUENTS OF FULLER'S EARTH

This is a continuation application based on PCT/EP9400593 filed Mar. 1, 1994.

BACKGROUND OF INVENTION

The subject of the invention is a method for the ecological utilization of acid effluents containing $Fe^{2+/3+}$-, $Al^{3+}$-, $Ca^{2+}$- and $Mg^{2+}$- ions. In addition, there is disclosed a sorption agent with good bleaching properties. Further, the filtrate produced during the process is generally free of heavy metals.

Sorption agents for the purification of plant oils and fats are usually based on naturally active or acid treated layered silicates based on bentonites with a high content of montmorillonite. Through acid treatment with inorganic acids like HCl or $H_2SO_4$, bentonites' bleaching activity is increased considerably because the divalent middle layer cation is exchanged by $H^+$ ions and also because the layered silicate is transformed partly into silicic acid which has a high effective surface. The effluents produced in this process, containing mainly $Fe^{2+/3+}$-, $Al^{3+}$-, $Ca^{2+}$- and $Mg^{2+}$- cations, as well as chloride or sulphate anions, are increasingly presenting an environmental problem because their disposal is costly and the remaining divalent and trivalent cations are unused.

EP-A 0 164 514 discloses the use of crystalline layered sodium silicates of composition $NaMSi_xO_{2x+1}$ y $H_2O$, in which M is sodium or hydrogen and x is from 1.9 to 4 and y is a number from 0 to 20, for softening of water which contains calcium and/or magnesium ions. The crystalline sodium silicates are produced by crystallization of x-ray amorphous sodium silicate and are designed to have a better calcium or magnesium binding capacity than zeolite A. Further, there are no indications of use of the acid waste water from production of bleaching earth.

A limited use for this kind of effluent is possible if it is used as a flocculent in the regeneration of communal effluent. Furthermore, if the iron ions are separated from the effluent, a reaction with a silicate (water glass) produces zeolite (see e.g. EPA-0 092 108).

DE-B-921 445 discloses a method for the production of bleaching earths which are characterized in that aluminum alkali alum, which contains in addition to potassium, iron, cobalt, chromium, nickel, manganese or other alum-forming heavy metals, are dissolved in water. The solution is precipitated with a silicate solutions, i.e. with an alkali silicate solution. The precipitate is then separated and dried. As aluminum alkali alums are used as pure salts, references to the use of salt containing effluents were not disclosed.

A similar process is found in DE-B-2 036 819 where silicate adsorption and drying agents with an alkali content of less than 98 weight % and specific physical properties are obtained by producing homogeneous precipitates from salt solutions containing at least one of the cations, $Fe^{2+}$-, $Mg^{2+}$-, $Zn^{2+}$-, $Mn^{2+}$-, $Al^{3+}$-, or $Fe^{3+}$, with the aid of aqueous alkali silicate solutions. These are then further processed in conventional processes. For the production of precipitates, however, pure salt solutions are used. References to the use of salt containing acid effluents are not disclosed.

JP-A-49 004349 discloses a method for the purification of an effluent in which reaction mixtures from acids and zeolitic diatomites are added to the effluent. The mixtures containing the metallic ions, $Al^{3+}$- and $Fe^{3+}$-, produce large flocs in the effluent which enhances purification. There are no references to the exploitation of acid salt-containing effluents for the production of sorption agents.

DESCRIPTION OF THE INVENTION

This invention has the aim of disposing of the named effluents in an ecologically acceptable way and at the same time using the dissolved constituents. It was surprisingly discovered that a sorption agent with good bleaching properties was produced from these constituents.

The object of the invention is thus a method for the ecological usage of acid effluents which produces a sorption agent which is characterized in that the acid effluent from the production of fullers earth, of which the main ingredients are $Fe^{2+/3+}$-, $Al^{3+}$-, $Ca^{2+}$- and $Mg^{2+}$- cations and inorganic anions, is reacted with an alkali silicate solution. The remaining precipitate is separated from the aqueous phase and, when necessary, purified and dried.

The sorption agent produced by this invention has, besides a high specific surface area and a high micropore volume, also an extraordinarily high ion exchange capacity. The trivalent cations $Fe^{3+}$-, $Al^{3+}$- are 99% removed after the addition of the silicate solution. The remaining aqueous phase contains only alkali- and alkali earth salts (chloride and sulphate, dependent on whether hydrochloric acid or sulfuric acid is used for the acid treatment of the layered silicates) and can therefore be disposed of in an ecological way.

It was also surprisingly found that the sorption agent produced with this invention is a better bleaching agent for edible oil than, for example, an acid activated fullers earth. In addition, the sorption agent removes phospholipids from soya oil better than silica gel.

It is preferable to use an acid effluent with a cation content of 0.4 to 25 g/l, more preferably from 0.4 to 12 g/l, especially from 0.4 to 2.5 g/l with a content of trivalent cations of 0.5 to 80 g/l, preferably 0.5 to 31 g/l and especially from 0.5 to 6 g/l. In general an effluent with the following cation content is used:

| | | |
|---|---|---|
| $Ca^{2+}$ | 0.2–25.0 g/l, pref. 0.2–5.0 g/l | especially 0.2–1.0 g/l |
| $Mg^{2+}$ | 0.2–20.0 g/l, pref. 0.2–7.0 g/l | especially 0.2–1.5 g/l |
| $Fe^{2+/3+}$ | 0.4–50.0 g/l, pref. 0.4–10.0 g/l | especially 0.4–2.0 g/l |
| $Al^{3+}$ | 0.1–80.0 g/l, pref. 0.1–21.0 g/l | especially 0.1–4.0 g/l |

The named cations are bound to chloride- or sulphate-anions depending on the origin of the effluent. Other inorganic ions such as nitrate- or perchlorate-anions may also be used.

Depending on the origin of the acid treated layered silicates, the effluents discussed may also contain in differing compositions the divalent and trivalent cations of trace elements in mg quantities.

Should the majority of the iron present in the effluent be in the form of $Fe^{2+}$- cations, then these can be removed with an oxidation agent, preferably an oxygen-rich gas, effectively air, and be oxidized to $Fe^{3+}$- ions. In this way a practical, quantitative separation of the iron can occur. It is however also possible to precipitate the $Fe^{2+}$ cations in the form of ferrous (II)-hydroxide and then oxidize this to ferric-(III)-hydroxide.

For the precipitation of the divalent and trivalent cations, a sodium silicate solution with a mass ratio of $SiO_2:Na_2O$ of about 3.25 to 3.40 is preferably used. A potassium silicate can also be used for this procedure.

The precipitation of the divalent and trivalent cations is preferably done at temperatures between about 20° to 100° C., preferably from about 40° to 100° C. and especially from about 60° to 80° C., e.g. at 70° C.

The precipitation can be done in such a way that the divalent and trivalent metals are dissolved by stirring in the alkaline silicate, or vice versa.

The quantitative proportions between the effluent and the alkali silicate are preferably such that the reactive medium after the precipitation of the sediment, has a pH value of about 5–7, preferably 6. In this way a practically neutral alkaline solution can be fed to the discharge, which is desirable on ecological grounds.

The separated precipitate, a mixture of mainly silicates and less importantly the hydroxides of the divalent and trivalent metals as well as the silicic acid, is purified, preferably by washing and then drying at temperatures of less than about 300° C., preferably from about 50° to 150° C., specifically about 80° C., until a moisture content of about 4 to 50 weight % is reached.

A further object of the invention is a sorption agent produced during the previously described process which has a specific surface area of about 100 to 600 m²/g, preferably from 200 to 500 m²/g, a micropore volume of about 0 to 14 nm: 0.2 to 0.7 ml/g 0 to 25 nm: 0.2 to 0.8 ml/g 0 to 80 nm: 0.2 to 0.9 ml/g; and an ion exchange capacity (IEC) of about 20 to 190 meq/100 g, preferably from 130 to 170 meq/100 g. The previously mentioned parameters were measured according to DIN/ISO-787/2 on material dried over a period of two hours at 105° C. in order to obtain a constant base. The source material and the end product can, however, as is indicated in the following, have different water contents.

The specific surface area of the previously described dried material is determined with the BET method (one point method with nitrogen after DIN 66 131).

The micropore volume is determined with the $CCl_4$-method (H. A. Renesi, R. V. Bonnar, C. F. Lee, Anal. Chem. 27, 1963 (1955)). With this method only the volume of the pores in the grains and not the space between the grains is determined.

The ion exchange capacity ("IEC") is determined as follows:

the sorption agent, dried as previously described, is reacted with an excess of aqueous $NH_4Cl$ solution for one hour under reflux. After standing for 16 hours at room temperature the solution is filtered, the filter cake is washed, dried and ground and the $NH_4^+$, content in the sorption material is determined using the Kjeldahl method.

A further object of the invention is the use of the above described sorption agent for the decoloring of oils, specifically for the removal of soaps, phospholipids and metallic ions from oils, particularly vegetable oils. Should the sorption agent be used for decolouring oils, then the preferred water content should be about 5 to 15 weight %, particularly about 6 to 8 weight %.

If the sorption agent is used for the removal of soaps, phospholipids and metallic ions, then the water content should preferably be about 30 to 50 weight %, particularly about 35 to 45 weight %.

The invention is illustrated by the following examples.

EXAMPLE 1

150 g sodium silicate water glass (37°/40° Be, 26.2 % $SiO^2$) is diluted with 1500 ml water. While stirring, an acid effluent of fullers earth containing 1.7 g/l $Fe^{2+/3+}$, 3.45 g/l $Al^{3+}$, 0.59 g/l $Ca^{2+}$, 1.17 $Mg^{2+}$ as well as several different polyvalent trace elements and alkali ions in the form of chloride (density 1.1 g/ml) is dripped into the solution at a temperature of 70° C. until the pH reaches 6. In order to improve the filtration characteristics of the resulting precipitate, the reaction medium is left for a further 15 minutes under the same conditions. The product is filtered, washed with water and dried at 80° C. until the water content is 7%.

The specific surface area, the micropore volume and the ion exchange capacity (determined after DIN/ISO 787/2) of the dried sorption agent are compared in Table 1 with a number of known sorption agents (acid treated highly active fullers earth, naturally active fullers earth, silica gel). The parameters of the known sorption agents were also determined after DIN/ISO 787/2.

TABLE 1

| Properties | sorption agent from example 1 | acid treated highly active fullers earth* | naturally active fullers earth** | silica gel*** |
|---|---|---|---|---|
| Specific surface area (mg²/g) | 365 | 250 | 81 | 483 |
| Micropore volume (ml/g) | | | | |
| 0–14 nm | 0.516 | 0.276 | 0.075 | 0.763 |
| 0–25 nm | 0.617 | 0.334 | 0.104 | 0.822 |
| 0–8– nm | 0.658 | 0.391 | 0.137 | 0.912 |
| IEC (meq/100 g) | 139 | 36 | 76 | 1.4 |

*Trade name TONSIL ®, Optimum FF - Sud-Chemie AG; $SiO_2$-content = 74%, water content = 7%.
**Trade name Terana ®D - Sud-Chemie AG; Water content = 7%.
***$SiO_2$-content of dry material: >99%, $H_2O$ content = 60%

As can be seen from Table 1, the specific surface area as well as the values for the three ranges of micropore volumes of the material described in the invention are, in comparison to the acid treated fullers earth, significantly higher. Surprisingly it was found also to have a very high IEC, something which underlines the difference between the material produced by the method described in this invention relative to the silica gel.

The analysis of the remaining effluent showed that the trivalent cations were removed with over 99% efficiency.

In the following Table 2, are given the concentrations of the individual cations in the effluent before and after treatment with water glass (sodium silicate).

TABLE 2

| Cations | Concentration (mg/l) | | Cations | Concentration (mg/l) | |
|---|---|---|---|---|---|
| | before | after | | before | after |
| | | | $Cu^{2+}$ | 0.31 | 0.03 |
| $Fe^{2+/3+}$ | 680 | 0.12 | $Zn^{2+}$ | 2.30 | 0.03 |
| $Al^{3+}$ | 1380 | 4.9 | $Ni^{2-}$ | 0.40 | 0.02 |
| $Ca^{2+}$ | 235 | 86 | $Co^{2+}$ | 0.12 | 0.08 |
| $Mg^{2+}$ | 468 | 151 | $Cr^{3+}$ | 0.41 | 0.003 |
| $Na^+$ | 3.7 | 4700 | $Pb^{3-}$ | 0.52 | 0.007 |
| $K^+$ | 46 | 20 | $Cd^{2-}$ | 0.002 | 0.002 |
| | | | $Hg^{2-}$ | <0.001 | <0.001 |
| | | | As total | 0.029 | 0.002 |

EXAMPLE 2

100 ml acid effluent from the production of fullers earth, containing 0.68 g/l $Fe^{2+/3+}$-, 1.38 g/l $Al^{3+}$-, 0.24 g/l $Ca^{2+}$- and 0.47 $Mg^{2+}$-, as well as several polyvalent trace elements (density 1.1), are diluted with 1500 ml water. A sodium silicate solution with a content of 26.2% is dripped into the solution at a temperature of 70° C. while constantly stirring until a pH of 6 is reached. In order to improve the filtration characteristics of the resulting precipitate the reaction medium is left for a further 15 minutes under the same conditions. The product is filtered, washed with water and dried at 80° C. until the water content is 4%.

As is shown in Table 3, a sorption agent with high specific surface area, a high micropore volume and, surprisingly, an unusually high OEC is obtained.

TABLE 3

| Specific surface micropore volume | 437 m²/g |
|---|---|
| 0–14 nm | 0.383 ml/g |
| 0–25 nm | 0.443 ml/g |
| 0–80 nm | 0.473 ml/g |
| IEC | 148 meq/g |

The effluent produced by the production of the sorption agent contains less than 1% of the originally present trivalent cations. The concentration of heavy metal cations is about equal to the data shown in Table 2.

APPLICATION EXAMPLE 1

The sorption agent produced by example 1 was tested as to its bleaching capacity on coconut oil. The bleach effectiveness was determined with the "Lovibond-Colourscan" method. For comparison two acid activated fullers earths were used, namely the products TONSIL® ACC FF (Trade product of the firm Sud-Chemie AG, specific surface area 222 m²I/g,, IEC 39 meq/100 g, water content 7%) and Fulmont®XX (Trade product of the firm Laporte, $SiO_2$ content 60%, BET surface area 300 m²/g, water content 8 %) as well as the silica gel given in Table 1. As can be seen from Table 4, the sorption agent produced as per the invention shows a markedly superior bleaching activity (red) than the silica gel and surprisingly, a superior bleach activity than both of the acid-treated fullers earths.

TABLE 4

Bleaching of coconut oil

| Material | Bleaching Agent % | T % | t (min) | P (mbar) | Lovibond-Colour figure 5¼" Cuvette red | yellow |
|---|---|---|---|---|---|---|
| unbleached | — | — | — | — | 11.5 | 68 |
| Sorption agent from ex 1 | 1.5 | 90 | 30 | 40 | 3.4 | 22.5 |
| TONSIL ® ACC FF | 1.5 | 90 | 30 | 40 | 3.6 | 21 |
| Fulmont ® XX | 1.5 | 90 | 30 | 40 | 3.6 | 20.5 |
| Silica gel | 1.5 | 90 | 30 | 40 | 4.1 | 25.0 |

APPLICATION EXAMPLE 2

Phospholipid Adsorption

The capacity of the sorption agent as produced by example 1 was tested as to its effectiveness for the absorption of phospholipids with the use of degummed undried soya oil. The sorption agent absorbed the water from the oil so that it reached a final water content of 45 weight %. As comparison the following materials were used: an acid treated fullers earth (TONSIL® Optimun FF; Table 1), a naturally active fullers earth (Terrana D; Table 1) as well as silica gel (Table 1). The sorption agent of the invention shows from the values in Table 5 a much higher binding capacity for phospholipids than the fullers earths, and shows, remarkably, also a clearly better adsorption performance than the silica gel.

TABLE 5

| Material | Bleaching Agent (%) | T (C) | t (min) | P (mbar) | P (ppm) | relative capacity for P (%) |
|---|---|---|---|---|---|---|
| untreated | 0.5 | | | | 26 | |
| Sorption agent from ex 1 | 0.5 | 90 | 30 | 20 | 12 | 100 |
| TONSIL ® Optimum Ff | 0.5 | 90 | 30 | 20 | 15 | 78 |
| Terrana ® | 0.5 | 90 | 30 | 20 | 20 | 43 |
| Silica gel | 0.5 | 90 | 30 | 20 | 16 | 71 |

We claim:

1. A method for the production of a sorption agent comprising gathering acid effluents from the production of Fuller's earth, wherein the acid effluents contain as constituents $Fe^{2+/3+}$-, $Al^{3+}$-, $Ca^{2+}$-, and $Mg^{2+}$ cations, as well as inorganic anions, reacting the acid effluents with an alkaline silicate solution at a temperature of about 60°–80° C. to produce a precipitate, and separating the resulting precipitate from the aqueous phase to produce the sorption agent, wherein said sorption agent has an ion exchange capacity of at least 20 to about 190 meq/100 g.

2. The method of claim 1 wherein the resulting precipitate is dried to produce the sorption agent.

3. The method of claim 1 wherein the acid effluent contains from about 0.4 to 25 g/l divalent cations and from about 0.5 to 80 g/l trivalent cations.

4. The method of claim 1 wherein the acid effluent contains from about 0.4 to 12 g/l divalent cations and from 0.5 to 31 g/l trivalent cations.

5. The method of claim 1 wherein the cation content of the acid effluent is about as follows:

| $Ca^{2+}$ | 0.2–25 g/l, |
|---|---|
| $Mg^{2+}$ | 0.2–20 g/l, |
| $Fe^{2+/3+}$ | 0.4–50 g/l, |
| $Al^{3+}$ | 0.1–80 g/l. |

6. The method of claim 1 wherein the cation content of the acid effluent is about as follows:

| $Ca^{2+}$ | 0.2–5 g/l, |
|---|---|
| $Mg^{2+}$ | 0.2–7 g/l, |
| $Fe^{2+/3+}$ | 0.4–10 g/l, |
| $Al^{3+}$ | 0.1–21 g/l. |

7. The method of claim 1 wherein the cation content of the acid effluent is about as follows:

| | |
|---|---|
| $Ca^{2+}$ | 0.2–1.0 g/l, |
| $Mg^{2+}$ | 0.2–1.5 g/l, |
| $Fe^{2+/3+}$ | 0.4–2.0 g/l, |
| $Al^{3+}$ | 0.1–4.0 g/l. |

8. The method of claim 1 wherein the $Fe^{2+}$ cations are oxidized to $Fe^{3+}$ cations using an oxidation agent.

9. The method of claim 8 wherein the oxidation agent is an oxygen-containing gas.

10. The method of claim 1 wherein the alkaline silicate solution is a sodium silicate solution with a weight ratio of $SiO_2$–$Na_2O$ of about 3.25 to 3.40.

11. The method of claim 1 wherein the ratio between the acid effluent and the alkaline silicate is selected so as to obtain a pH in a reaction medium of about 5 to 7, after settling of the precipitate.

12. The method of claim 1 wherein the precipitate is purified by washing and drying at temperatures of less than about 300° C. until the water content of the precipitate is about 4 to 50 weight %.

13. The method of claim 12 wherein the separated precipitate is dried at temperatures of about 50° to 150° C.

14. The sorption agent produced by the method of claim 1 which has the following characteristics:
(a) a specific surface area of about 100 to 600 $m^2/g$;
(b) a micropore volume of about 0 to 14 nm: 0.2 to 0.7 ml/g 0 to 25 nm: 0.2 to 0.8 ml/g 0 to 80 nm: 0.2 to 0.9 ml/g; and (c) an ion exchange capacity (IEC) of about 20 to 190 meq/100 g.

15. The sorption agent of claim 14 with the following characteristics:
(a) a specific surface area of about 200 to 500 $m^2/g$;
(b) a micropore volume of about 0 to 14 nm: 0.2 to 0.7 ml/g 0 to 25 nm: 0.2 to 0.8 ml/g 0 to 80 nm: 0.2 to 0.9 ml/g; and (c) an ion exchange capacity of from about 130 to 170 meq/100 g.

16. The sorption agent of claim 14 with a water content of about 5 to 15 weight %.

17. The sorption agent of claim 14 with a water content of about 30 to 50 weight %.

18. A process for the removal of color from oils and the removal of soaps, phospholipids and metallic ions from oils by use of a sorption agent comprising
(a) preparing the sorption agent by the process of claim 1, and
(b) Contacting the oils with the sorption agent to remove color, and soaps, phospholipids and metallic ions.

19. The process of claim 18 wherein the sorption agent has a water content from about 5 to about 15 weight percent.

20. The process of claim 18 wherein the sorption agent has a water content of about 30 to 50 weight percent.

* * * * *